United States Patent
Tang et al.

(10) Patent No.: US 10,648,929 B2
(45) Date of Patent: May 12, 2020

(54) TRAILED MULTIPLE-VIEWING-ANGLE ITEM INSPECTION SYSTEM AND METHOD OF USING THE SAME

(71) Applicant: NUCTECH COMPANY LIMITED, Beijing (CN)

(72) Inventors: Huaping Tang, Beijing (CN); Zhiqiang Chen, Beijing (CN); Yuanjing Li, Beijing (CN); Xin Jin, Beijing (CN); Zhuoyan Liu, Beijing (CN); Yonggang Wang, Beijing (CN); Hua Peng, Beijing (CN); Zhanfeng Qin, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 0 days.

(21) Appl. No.: 15/300,751

(22) PCT Filed: Dec. 14, 2015

(86) PCT No.: PCT/CN2015/097257
§ 371 (c)(1),
(2) Date: Sep. 29, 2016

(87) PCT Pub. No.: WO2016/095774
PCT Pub. Date: Jun. 23, 2016

(65) Prior Publication Data
US 2017/0276619 A1    Sep. 28, 2017

(30) Foreign Application Priority Data
Dec. 17, 2014    (CN) .......................... 2014 1 0790356

(51) Int. Cl.
*G01N 23/04*    (2018.01)
*G01V 5/00*    (2006.01)

(52) U.S. Cl.
CPC ............. *G01N 23/04* (2013.01); *G01V 5/005* (2013.01); *G01V 5/0016* (2013.01)

(58) Field of Classification Search
CPC ....... G01N 23/04; G01V 5/0016; G01V 5/005
(Continued)

(56) References Cited

U.S. PATENT DOCUMENTS 5,065,418 A    11/1991  Bermbach et al.
6,018,562 A *  1/2000   Willson ............... G01N 23/087
                                                        378/57

(Continued)

FOREIGN PATENT DOCUMENTS

CN    2469444 Y    1/2002
CN    1376947 A    10/2002
(Continued)

OTHER PUBLICATIONS

European Patent Application No. 15869281.4; Extended Search Report; dated Oct. 9, 2017; 9 pages.
(Continued)

*Primary Examiner* — Courtney D Thomas
(74) *Attorney, Agent, or Firm* — BakerHostetler

(57) ABSTRACT

Embodiments of the present invention provide a trailed multiple-viewing-angle item inspection system and method of operating the same. The inspection system includes: a trailer vehicle, a radiation inspection device, a power supply device and a power grid connection device. The trailer vehicle is mounted with a power supply chamber within which a power supply device and a power grid connection device are mounted and an inspection chamber within which a radiation inspection device is mounted. The radiation inspection device includes: ray radiation source configured to emit X-rays from various positions, detectors, a body frame, a transfer device, a data and image process system
(Continued)

and a display and operation device. The trailed multiple-viewing-angle item inspection system of the present invention can obtain a transmission image containing depth information of an item by its one pass through the device, and achieve a high-speed inspection, a good image quality and a high inspection efficiency of hazardous articles, and its flexibility and movability can meet requirements in various working conditions.

18 Claims, 4 Drawing Sheets

(58) Field of Classification Search
USPC .................................................. 378/57, 62
See application file for complete search history.

(56) References Cited

U.S. PATENT DOCUMENTS

| | | | | |
|---|---|---|---|---|
| 6,018,652 | A * | 1/2000 | Frager | H04M 15/00 |
| | | | | 455/406 |
| 2004/0017887 | A1 | 1/2004 | Le et al. | |
| 2004/0141584 | A1 | 7/2004 | Bernandi et al. | |
| 2007/0133744 | A1 * | 6/2007 | Bijjani | A61B 6/032 |
| | | | | 378/57 |
| 2011/0142201 | A1 * | 6/2011 | Eberhard | G01V 5/0008 |
| | | | | 378/57 |
| 2011/0206179 | A1 | 8/2011 | Bendahan | |
| 2011/0268245 | A1 * | 11/2011 | Eberhard | G01T 1/2985 |
| | | | | 378/5 |
| 2013/0156156 | A1 | 6/2013 | Roe et al. | |
| 2014/0185754 | A1 | 7/2014 | Tang et al. | |
| 2015/0378048 | A1 * | 12/2015 | Schubert | G01V 5/0025 |
| | | | | 378/57 |

FOREIGN PATENT DOCUMENTS

| | | |
|---|---|---|
| CN | 1490615 A | 4/2004 |
| CN | 1607385 A | 4/2005 |
| CN | 101329285 A | 12/2008 |
| CN | 101571497 A | 11/2009 |
| CN | 101685071 A | 3/2010 |
| CN | 201514387 U | 6/2010 |
| CN | 201935878 U | 8/2011 |
| CN | 103026214 A | 4/2013 |
| CN | 103226114 A | 7/2013 |
| CN | 203325480 U | 12/2013 |
| CN | 203623478 U | 6/2014 |
| CN | 103901057 A | 7/2014 |
| CN | 104101615 A | 10/2014 |
| CN | 104165896 A | 11/2014 |
| CN | 104459812 A | 3/2015 |
| CN | 204536571 U | 8/2015 |
| JP | H08-127282 A | 5/1996 |
| JP | H10-267867 A | 10/1998 |
| JP | 2005-537468 A | 12/2005 |
| JP | 2008-111837 A | 5/2008 |
| JP | 2009-236542 A | 10/2009 |
| JP | 2010-243169 A | 10/2010 |
| JP | 2013-064619 A | 4/2013 |

OTHER PUBLICATIONS

Xiao et al.; "Method of Multiple View Stereoscopic Radiography"; Journal of Optoelectronics Laser; vol. 14 No. 10; Oct. 2003; 3 pages (*contains English Abstract*).

Cheng et al.; "Multiple viewing angle X-Ray security imitate system"; Police Technology; May 2007; p. 48-50 (*contains English Abstract*).

International Patent Application No. PCT/CN2015/097257; Int'l Search Report; dated Mar. 17, 2016; 2 pages.

* cited by examiner (a)

(b)

(c)

(d)

TRAILED MULTIPLE-VIEWING-ANGLE ITEM INSPECTION SYSTEM AND METHOD OF USING THE SAME

CROSS-REFERENCE TO RELATED APPLICATIONS

This application is a Section 371 National Stage Application of International Application No. PCT/CN2015/097257, filed on Dec. 14, 2015, entitled "Trailed multiple-viewing-angle item inspection system and method of using the same", which claims priority to Chinese Application No. 201410790356.X, filed on Dec. 17, 2014, incorporated herein by reference in their entirety.

TECHNICAL FIELD

The present invention relates to X-ray radiation transmission imaging, and particularly to a movable multiple-viewing-angle X-ray radiation transmission imaging system.

BACKGROUND

X-ray radiation transmission imaging safety inspection device is widely used in airport, rail transit, port, government office, important activity field and the like. Due to provisionality, periodicity, unexpectedness, great fluctuation of amount of object to be inspected in some application locations, and even operation in wild country, a safety inspection device having a movable ability is becoming a tendency. Meanwhile, different requirements of safety level will be raised, even in some situations a safety inspection device is required to provide a better performance. For example, an inspection on an item from multiple-viewing-angle is needed to obtain multiple-viewing-angle images thereof so as to make a compositive and punctilious analysis on the item to more effectively find hidden contraband goods and hazardous articles and the like.

Some conventional technology is developed to meet the above requirements. For example, self-moving radiation item inspection system and method are provided, in which an item inspection system is provided on a self-moving mechanism and thus can be placed neatly and rapidly in a small-scale region, but is not adapted for a long distance transfer and operation in wild country. For example, a baggage scanning vehicle is provided, in which a vehicle carried X-ray radiation inspection device is provided to move in a long distance, and a generator is equipped to enable the X-ray radiation inspection device to work in a wild country. However, this baggage scanning vehicle will occupy a rather great place of locations such as airport, station, custom, conference central and the like, and is not convenient for moving in these locations. Further, as the generator produces big noise and exhaust gas and is mounted in the same vehicle with the inspection device, imaging quality will be degraded due to vibration of the generator. In addition, when the system is transferred, a professional driver having a driving qualification is needed, which increases personal cost for operation of the whole system. For example, a medium or small scale vehicle radiation scanning and inspecting device is provided, in which a radiation inspection system is configured to be movable and assembled, and a radiation source is located on top of a frame such that scanning is performed from lateral orientation to vertical orientation, improving planar visibility of image. However, the device is hard to be moved and installed, and the obtained image is still a planar image and thus cannot provide information in depth direction and image quality is improved to a limited extend. For example, a special moving item X-ray radiation inspector is provided, in which an X-ray radiation inspector is provided to be integrated onto a tractor and perform inspection from a plurality of orientations on an item by means of a rotatable safety inspection platform, so as to generate a three dimension image and achieve a good inspection performance. However, the rotatable inspection device has a low inspection speed and thus a low inspection efficiency.

SUMMARY

Embodiments of the present invention provide a trailed multiple-viewing-angle item inspection system, comprising an trailer vehicle and a radiation inspection device located on the trailer vehicle, wherein, the trailer vehicle may be used for connecting an trailed tractor for a long distance movement;

the radiation inspection device comprises: a body frame, an inspection passage located within the body frame, a transfer device located below the inspection passage, an X-ray radiation source fixed on the body frame and detectors fixed on the body frame opposite to the X-ray radiation source;

characterized in that the X-ray radiation source is configured to emit X-ray radiation from two different positions where are motionless with relative to the inspection passage.

A method of using a trailed multiple-viewing-angle item inspection system is adopted by the above trailed multiple-viewing-angle item inspection system, the method comprises:

(1) movement step, in which the trailed item inspection system is moved to an utility location by means of a tractor or manually;

(2) preparation step, in which the inspection system is performed a preparation process to reach a state where it can take an inspection on the item;

(3) inspection step, in which the item is processed a safety inspection by means of the radiation inspection device;

(4) close and movement step, in which the radiation inspection device is closed after the inspection step is completed and the trailed item inspection system is again transferred manually or by means of a tractor.

BRIEF DESCRIPTION OF THE DRAWINGS

A further description of the present disclosure is made in detailed with combination to the drawings and embodiments, in which.

Figure 1:
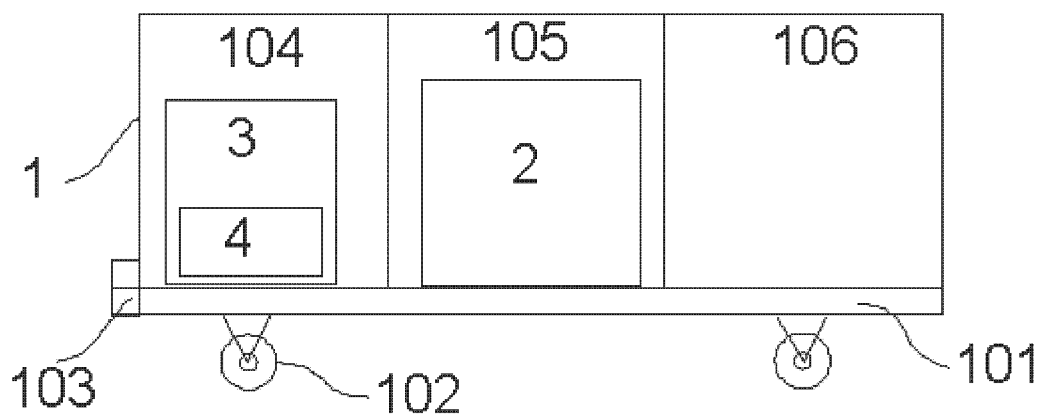
FIG. 1 is a structural schematic view of a trailed multiple-viewing-angle item inspection system.

In the drawings, reference numbers are denoted as below: 1—trailer vehicle, 101—chassis, 102—moving wheels, 103—trailing connection device, 104—electrical power supply chamber, 105—inspection chamber, 106—control chamber, 2—radiation inspection device, 201—X-ray radiation source (including 201a and 201b), 202—detector, 203—body frame, 204—transfer device (including 204a, 204b, 204c, 204d), 206—display and control device, 3—power supply device, 4—power grid connection device, 5—item to be inspected.

DETAILED DESCRIPTION OF THE EMBODIMENTS

According to an embodiment of the present invention, there is provided a trailed multiple viewing angle item inspection system, comprising an trailer vehicle 1 and a radiation inspection device 2 mounted in the trailer vehicle 1.

In the embodiment, the trailer vehicle 1 includes a chassis 101, moving wheels 102 fixed at a lower portion of the chassis, a trailing connection device 103 located at an end of the chassis and at least a chamber located over the chassis. The moving wheels 102 have a front wheel group and a rear wheel group. For example, the front wheel group have two front wheels and the rear wheel group have two rear wheels. The chassis 101 may further include, for example, a steering device, a braking device, a stationary support device, and the like. The steering device is provided to control a moving direction of the vehicle during movement of the moving wheels, thereby improving flexibility of the trailer vehicle for moving in a small region. The braking device is provided for braking the moving wheels so as to, on one hand, avoid the trailer vehicle from out of control during its movement, and, on the other hand, stop the trailer vehicle at a fixed position when being at rest. The stationary support device is provided for support in replace of the front and rear wheel groups when the trailer vehicle is stationary and will stop for a long period of time. Specifically, the stationary support device may be an automatic or manual screw elevator support. The chamber is provided such that the radiation inspection device 2 and the like can be placed there in or provided for a comfortable working situation, and includes at least an inspection chamber 105 in which the radiation inspection device 2 is mounted. The radiation inspection device 2 may be arranged within the inspection chamber 105, and may be orientated to be parallel to a longitudinal symmetry axis of the trailer vehicle, or arranged within the inspection chamber 105 in other suitable manner. The inspection chamber 105 is designed to have a chamber door that may be opened such that an item to be inspected may enter or exit the inspection chamber 105 when the radiation inspection device 2 is in operation. For example, the chamber door is arranged at both sides of the inspection chamber 105 with relative to a longitudinal direction of the trailer vehicle 1 such that the item to be inspected may enter the inspection chamber from its one side and exit out of the other side.

The trailer vehicle 1 allows the radiation inspection device 2 to be rapidly moved with a low cost. Movement and placement of the radiation inspection device 2 within a small-scale region may be achieved by workers or common exterior force, without a tractor. Further, the radiation inspection device 2 occupies a rather small space, and may be operated neatly, even without any professional. When transferred to various fields for a medium or long distance, the radiation inspection device 2 may be moved rapidly by means of a tractor, such as a specific tractor head or a common car. In addition, the chamber may be configured such that the radiation inspection device 2 is fully protected (from directly contact, rain, wind, sunlight) during movement. In an embodiment, the trailer vehicle may be configured to move for a long distance by itself.

The radiation inspection device 2 includes a ray source 201, detectors 202, a body frame 203, a transfer device 204, a data and image processing system 205, and a display and control device 206. The body frame 203 has a frame structure, in which an inspection passage is provided. Below the inspection passage, the transfer device 204 is provided. The ray source 201 is fixed on the body frame 203. a number of the ray source may be one, or may be more. In a situation where a plurality of ray sources are provided, such as denoted by 201a, 201b, the ray sources may be, such as, a common X-ray radiation source with a plurality of target points, or a distributed X-ray radiation source with a single target point, or a distributed X-ray radiation source with a plurality of target points, a combination of a plurality of common X-ray radiation sources and a distributed X-ray radiation source, and the like. The detectors 202 are fixed at a position on the body frame 203 opposite to the ray source 201, with the inspection passage defined between the ray source 201 and the detectors 202. Generally, the detectors 202 form detector array consisting of a plurality of detector units. Alternatively, the detectors 202 may be arranged as a plurality of rows of detectors. Corresponding to a plurality of X-ray radiation sources, the detectors 202 may be a plurality of groups of detectors, such as denoted by 202a, 202b. The body frame 203 generally includes a frame, a panel, a shielding device, an installation structure and the like. The transfer device 204 may include three sections, i.e., a main body section located within the body frame and two extension sections respectively located at an entry side and exit side for an item. Connection mechanisms are provided at locations where the entry extension section and the exit extension section are connected to the body frame such that the entry extension section and the exit extension section may be extended into a horizontal state during operation and may be contracted during non-operation to reduce a occupied space.

An important technology index of the radiation source 201 that is used for the radiation inspection device 2 is energy. The energy may decide penetration ability of an X-ray radiation that it emits, that is, higher energy the X-ray radiation has, a greater depth and a material with greater density it can penetrate. Generally, the X-ray radiation generated by the radiation source 201 is emanatively emitted in three dimensions and a portion of the X-ray radiation in a direction that has a maximal intensity is used for imaging in a transmission manner and a portion of the X-ray radiation in other directions is shielded. The reasons for that are, on one hand, to prevent stray X-ray radiation from affecting imaging process and on the other hand, to maintain a safe intensity level of the X-ray radiation in the surrounding environment below a intensity level specified by a national standard. Generally, heavy metal, such as lead, is used to shield X-ray radiation and a width of a shielding structure is commonly associated with the energy of the X-ray radiation, that is, higher the energy of the X-ray radiation is, thicker the shielding structure is, and thus heavier the shielding structure is. Thus, the energy of the X-ray radiation has its effects in opposite sides, i.e., higher energy will render inspection ability on items with increased size while the shielding structure has a thickened thickness when the energy is increased. In addition, a X-ray radiation source with increased energy will have a higher price. A multiple-viewing-angle item inspection system according to embodiments of the present invention is configured to pass and inspect items, size of which does not exceed 1.5 m×1.5 m, such as, baggage, package, postal matter, postal parcel, small-scale cargo, and the like. It is suitable that the X-ray radiation source 201 in the radiation inspection device 2 has energy less than 1 MeV (i.e., $10^6$ eV). In the embodiment, the X-ray radiation source has a low cost and the shielding structure has a relative small thickness. Small weight and low cost allow the radiation inspection device 2 in the embodiment to be suitable for a bearing requirement of a mini-trailer vehicle, such as less than 1 ton, thereby the whole trailed multiple-viewing-angle item inspection system has a non-degraded flexibility and low cost.

The X-ray radiation source 201 may also include a plurality of common single target point X-ray radiation sources. The plurality of common single target point X-ray radiation sources may be arranged on the body frame 203 to surround the inspection passage. For example, they may be arranged on a perpendicular cross section of the inspection passage, or on an oblique cross section of the inspection passage. In such an arrangement, multiple viewing angles of the inspection passage may be obtained, such as top viewing and side viewing. The plurality of common X-ray radiation sources may further be arranged on the body frame 203 to be parallel to (arranged along) the inspection passage, such as, arranged along a direction in which that the items pass through the inspection passage. Meanwhile, X-ray radiation from the X-ray radiation sources is emitted from various output orientations and penetrate through the inspection passage at various angles (i.e., through cross sections of the inspection passage having different oblique angles). In this way, images of the inspection passage at different viewing angles may be obtained, such as forward oblique viewing angle and backward oblique viewing angle.

The X-ray radiation source 201 may further be a multiple-target-point distributed X-ray radiation source. The distributed X-ray radiation source has a plurality of target points at various locations therein, which may generate X-ray radiation from various locations. The distributed X-ray radiation source may be arranged on the body frame 203 with the plurality of target points around (or partially around) the inspection passage, achieving inspection on a cross section of the inspection passage at different viewing angles. The plurality of target points may also be arranged on the body frame 203 to be parallel to the inspection passage and emit X-rays which penetrate the inspection passage at various oblique viewing angles by means of a collimator, thereby obtaining inspection of the inspection passage at various viewing angles.

The X-ray radiation source 201 may further be provided as a combination of the above mentioned common single target point X-ray radiation source and distributed multiple-target-point X-ray radiation source, so as to achieve an arrangement enabling inspection of the inspection passage at various viewing angles.

In the above embodiments, transmission images of the inspected item can be obtained rapidly at a plurality of viewing angles during the item' single pass through the inspection passage at a certain velocity. Further, the multiple-viewing-angle inspection system may obtain transmission images of the inspected item at various depths, i.e., information of internal portions of the inspected item in a depth direction, and thus obtain images with abundance information and in good quality, and can achieve improved inspection, such as an improved inspection efficiency of contraband goods.

In the above embodiments, the detectors 202 and the X-ray radiation source 201 are arranged opposite to each other with the inspection passage therebetween. The detectors 202 corresponding to the X-ray radiation sources may be grouped into a group or may be grouped into a plurality of groups. In an embodiment of the present invention, a plurality of X-ray radiation sources or a plurality of target points of one X-ray radiation source are arranged in the same cross section of the inspection passage while the detectors 202 are also arranged in a group in a cross section to receive the X-ray radiation generated by respective X-ray radiation sources or respective target points. In an another embodiment of the present invention, X-rays generated by a plurality of X-ray radiation sources or a plurality of target points of one X-ray radiation source penetrates the inspection passage to form a plurality of different ray sections which intersect each other on a linear line at or near an edge of the inspection passage. The detectors 202 are arranged in a group and on the intersection line of the plurality of ray sections to receive X-ray radiation from the respective X-ray radiation sources or target points. In a still further embodiment of the present invention, X-rays by a plurality of X-ray radiation sources or a plurality of target points of one X-ray radiation source penetrates the inspection passage to form a plurality of different ray sections which intersect each other near the edge of the inspection passage. The detectors 202 may be arranged in groups, the number of which is the same as the number of the ray sections. That is, one group of detectors is arranged to receive X-rays a corresponding one of the ray sections.

In the above embodiments, in a situation where the detectors are arranged in one group, preferably, the plurality of X-ray radiation sources or the plurality of target points of one X-ray radiation source are configured to operate alternately to emit X-rays. Meanwhile, the display and control device 206 acquires, by means of a logic judgment, which X-ray radiation source or target point the X-rays received by the detectors at a certain moment come from, such that the data and image process system 205 may establish an image of a cross section of the inspection passage that is irradiated by the X-rays generated by the X-ray radiation source or the target point, by using signals from the detectors 202 at that moment. That is, information acquired from the detectors are attributed to respective cross sections at various viewing angles according to the moment scale in order to establish transmission image at the various viewing angles. In the embodiment where the detectors are arranged in one group, the trailed multiple-viewing-angle item inspection system has an advantage of low cost.

In the above embodiments, in a situation where the detectors are grouped into a plurality of groups, preferably, a plurality of R-ray sources or target points in a plurality of cross sections emit X-rays simultaneously, and the plurality of groups of detectors are configured to receive X-rays from the R-ray sources or target points in respective ray sections. The data and image process system 205 judges which cross section the signals derive from based on positions of the detectors and uses the signals to establish transmission image of the cross section at a corresponding viewing angle. The embodiment which includes a plurality of groups of detectors has a higher efficiency of detection and great inspection velocity. It is noted that, in the embodiment where the detectors are grouped into a plurality of groups, the X-ray radiation sources or target points in various cross sections may emit X-rays alternately, thereby reducing influence from stray X-rays and improving image quality although inspection velocity is not optimized.

It is particularly noted that, in the above embodiments of the present invention, the X-ray radiation source is fixed with relative to the inspection passage, i.e., it is motionless. During operation, the target points that generate X-rays are motionless. Conventionally, a multiple-viewing-angle inspection system is provided by using an item rotatable support or by rotating (moving) the X-ray radiation source. As the item or the X-ray radiation source is rotating, the imaging process is a dynamic image process, which unavoidably causes artifacts (for example, target point movement distance becomes longer) degrading the image quality. Compared to this, the multiple-viewing-angle item inspection system of the present invention provided with the motionless or stationary X-ray radiation source can achieve a better image quality.

It is particularly noted that the X-ray radiation inspection device 2 may also be not mounted on the trailer vehicle, but rather, mounted in a common room, to provide a separate integral multiple-viewing-angle item inspection system. For example, in an embodiment, a multiple-viewing-angle item inspection system is configured such that a plurality of X-ray radiation sources or a plurality of target points of an X-ray radiation source generate X-rays to penetrate an inspection passage so as to form a plurality of different ray sections, which intersect each other on a common intersection line at or near an edge of the inspection passage. A group of detectors 202 are arranged on the intersection line of the ray sections to receive X-ray radiation from the plurality of X-ray radiation sources or the plurality of target points of the X-ray radiation source. The embodiment has advantages of notable low cost, high inspection speed, good image quality and high efficiency of inspection on dangerous goods.

The trailed multiple-viewing-angle item inspection system according to an embodiment of the present invention may further include a power supply device 3 and a power grid connection device 4. The power supply device 3 is used to supply power to the radiation inspection device 2 in a situation where no power grid is provided, such as an open country, a road crossing, a piazza and the like. The power supply device 3 may be a generator, secondary battery pack and the like. The power grid connection device 4 is used in a situation where power grid is provided, such as a station, an indoor location and the like, to rapidly connect the radiation inspection device 2 to the power grid system. The power grid connection device 4 includes a cable and a cable coupling, and may further include a power supply switch and a cable reel and the like. The trailed multiple-viewing-angle item inspection system according to the embodiment of the present invention is provided with both the power supply device 3 and the power grid connection device 4 such that circumstance applicability of the system is largely enhanced, that is, the system can operate not only in outwork locations by means of electrical energy from the generator but also in indoor locations by connecting to the power grid by the power grid connection device 4, which avoid affection on the indoor circumstance from the noise and exhaust gas of the generator and influence on the radiation inspection device 2 from vibration of the generator. The power supply device 3 and the power grid connection device 4 together with the radiation inspection device 2 may be mounted in the inspection chamber 105. Preferably, the trailer vehicle further includes a power supply chamber 104, within which the power supply device 3 and the power grid connection device 4 are mounted. The power supply chamber is provided with a vibration damping device and a noise separating device to eliminate influence of the vibration, noise, exhaust gas and heat of the generator on the radiation inspection device 2.

It is particularly noted that, in an embodiment of the trailed multiple-viewing-angle item inspection system where the power supply device 3 and the power grid connection device 4 are not provided, the trailed multiple-viewing-angle item inspection system can operate by connecting the radiation inspection device 2 to an interior electrical power supply by other ways.

In the trailed multiple-viewing-angle item inspection system according to an embodiment of the present invention, the trailer vehicle may further include a control chamber 106 configured to provide a comfortable circumstance for operation of the radiation inspection device 2. The display and control device 206 of the radiation inspection device 2, and desk, chair and the like may be mounted within the control chamber 106, and the control chamber 106 is provided with a door for an operator to enter or exit the chamber. The control chamber 106 may further be provided with a lighting device, an air condition device and a viewing window, etc.

Embodiments of the present invention are further described in combination with the drawings.

FIG. 1 is a schematic view of a trailed multiple-viewing-angle item inspection system, viewed from a side thereof. The trailed multiple-viewing-angle item inspection system includes a trailer vehicle 1 and a radiation inspection device 2, a power supply device 3 and a power grid connection device 4 mounted in the trailer vehicle 1. The trailer vehicle 1 includes a chassis 101, moving wheels 102 fixed at lower portion of the chassis, a trailing connection device 103 located on an end of the chassis and a chamber located over the chassis. There may provided a plurality of the chambers, such as a power supply chamber 104, an inspection chamber 105 and a control chamber 106.

Figure 2:
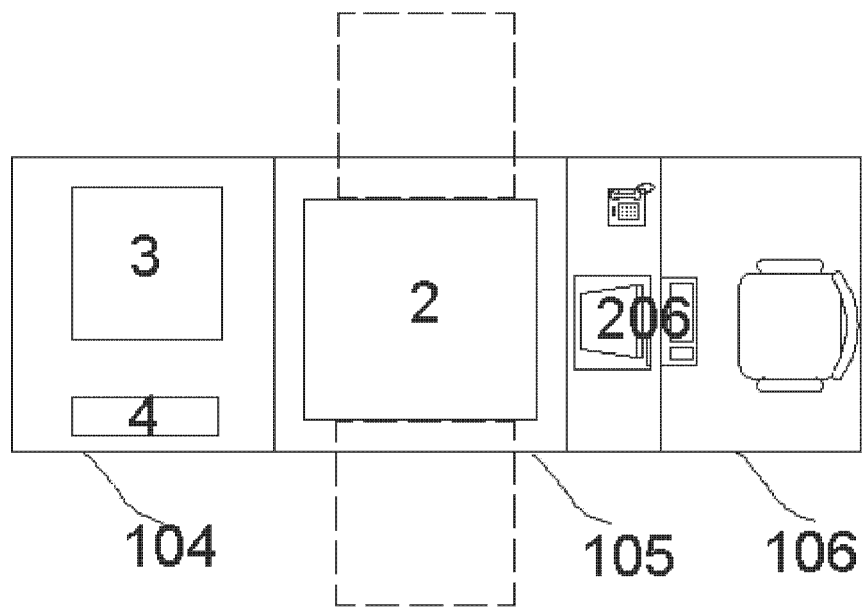
FIG. 2 is a schematic arrangement view within a chamber.

FIG. 2 is a schematic top view of an arrangement within the chamber. The power supply chamber 104 is located at an anterior portion of the chassis 101. The power supply device 3 and the power grid connection device 4 are mounted within the power supply chamber 104. The inspection chamber 105 is located at a middle portion of the chassis 101. A radiation inspection device 2 is mounted within the inspection chamber 105 and an inspection passage of the radiation inspection device 2 is arranged in a direction perpendicular to an axis of the chassis 101. The inspection chamber 105 is provided with movable doors at its both sides. The positions of the movable doors correspond to a location of the inspection passage and the movable doors are dimensioned such that, when the movable doors are opened, a transfer device 204 may extend out of the inspection chamber 105. Positions of an entry extension section and an exit extension section the transfer device 204 in a working state is illustrated by dash lines in FIG. 2. The control chamber 106 is located at a trailing portion of the chassis, and the display and operation device 206 and desk and chair (not shown) are mounted within the control chamber 106. The power supply device 3 may be a generator, or may be a battery pack, or the like, configured to supply electrical power to the radiation inspection device 2. The power grid connection device 4 includes a cable, a coupling and a switch and is configured to connect the radiation inspection device 2 to a power grid supply system. The power grid connection device 4 may even further include a cable winding drum for winding the cable.

Figure 3:
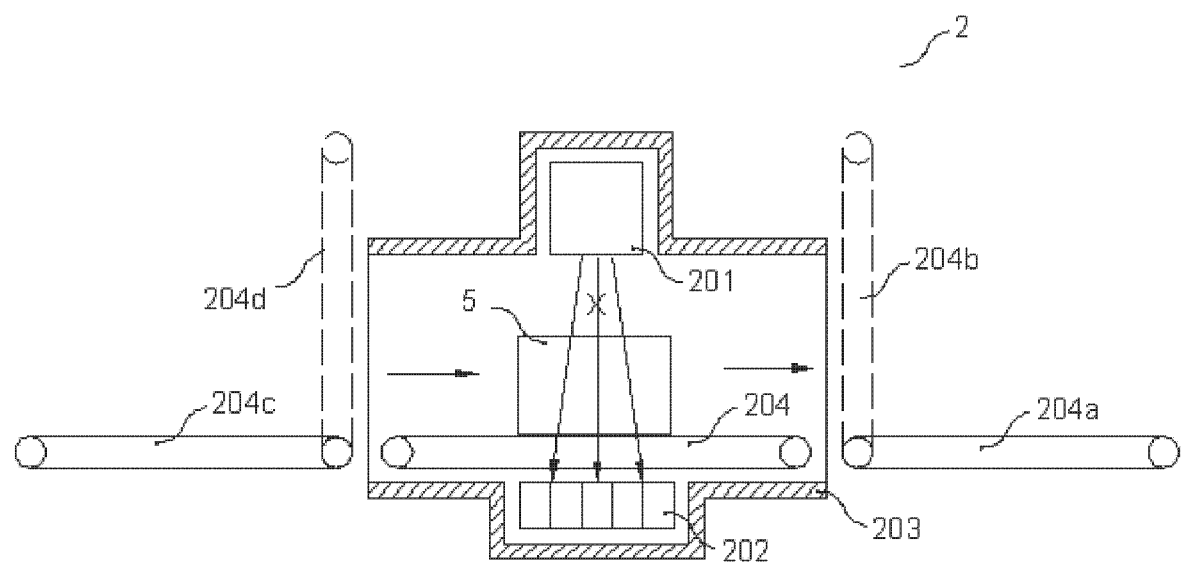
FIG. 3 is a structural schematic view of a radiation inspection device.

FIG. 3 is a structural schematic view of the radiation inspection device. The radiation inspection device 2 includes an X-ray radiation source 201, detectors 202, a body frame 203 and a transfer device 204. The X-ray radiation source 201 is fixed on the body frame 203. The X-ray radiation source 201 may be one X-ray radiation source, or may be a plurality of X-ray radiation sources. When there are a plurality of the X-ray radiation sources, they are denoted by 201a, 201b. The detectors 202 are fixed on the body frame 203 at positions opposite to the X-ray radiation source 201. The detectors 202 are generally arranged in a detector array consisting of a plurality of detector units, or may be arranged in a plurality of rows of detector array. The body frame 203 generally includes a framework, a panel, a shielding device and an installation structure. The transfer device 204 may include three sections, i.e., a main body section located within the body frame and two extension sections respectively located at an entry side and an exit side for item. The entry extension section and the exit extension section may be extended to a horizontal arrangement in a working state and may be contracted in a non-working state to reduce space they occupy. In FIG. 3, an arrangement of the entry extension section of the transfer device in working state is denoted by 204c and an arrangement of the entry extension section that is contracted vertically in non-working state is denoted by 204d. Arrangement of the exit extension section of the transfer device in working state is denoted by 204a and arrangement of the exit extension section that is contracted vertically in non-working state is denoted by 204b. The arrangements of the entry extension section and the exit extension section of the transfer device may be switched manually, or automatically under control of a button by means of a motor device.

Figure 4:
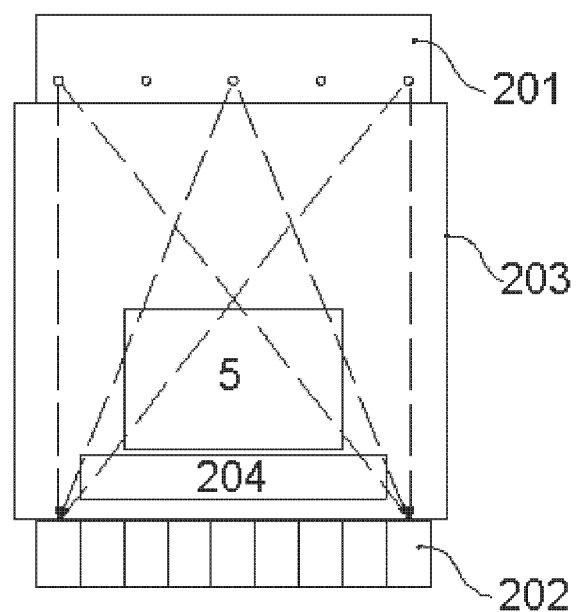
FIG. 4 is a schematic view of an embodiment where X-ray radiation source is a distributed multiple-target point X-ray radiation source.

FIG. 4 is a schematic view of an embodiment of the present invention where the X-ray radiation source is a distributed multiple-target-point X-ray radiation source. The X-ray radiation source 201 includes a plurality of target points, each of which emits X-rays according to a preset operation mode. The X-rays penetrates through the item 5 to be inspected and are received by the detectors 202, and subsequently, the received rays are analyzed and processed by a data and image process system 205 (not shown) to generate a transmission image of the item 5.

Figure 5:
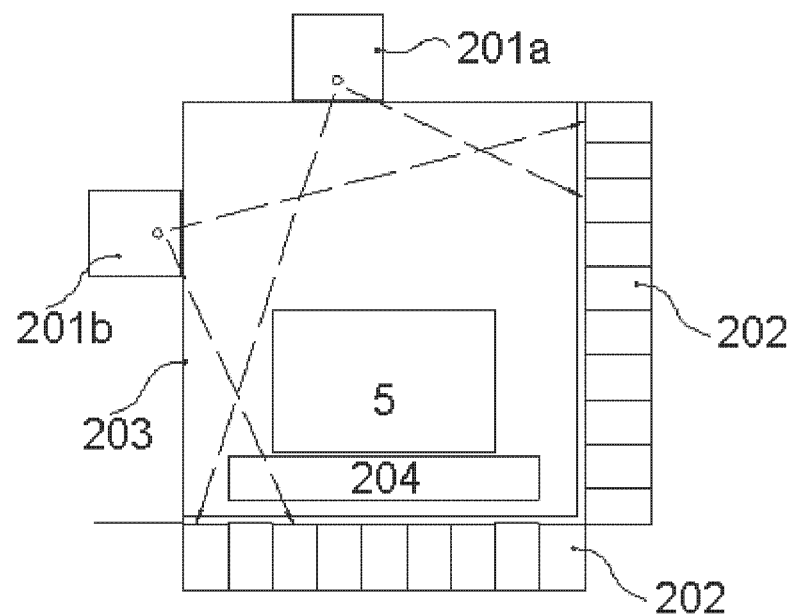
FIG. 5 is a schematic view of an embodiment including a plurality of X-ray radiation sources.

FIG. 5 is a schematic view of an X-ray radiation source that includes a plurality of X-ray radiation sources in another embodiment of the present invention, with some differences from that as shown in FIG. 4. In the embodiment, two X-ray radiation sources 201a, 201b are arranged on different positions of the body frame 203 and generate X-rays alternately and in sequence according to instructions from the display and control device 206. The generated X-rays penetrate through the item 5 to be inspected and then are received by the detectors 202, and subsequently, the received rays are analyzed and processed by a data and image process system 205 (not shown) to generate a transmission image of the item 5.

Figure 6:
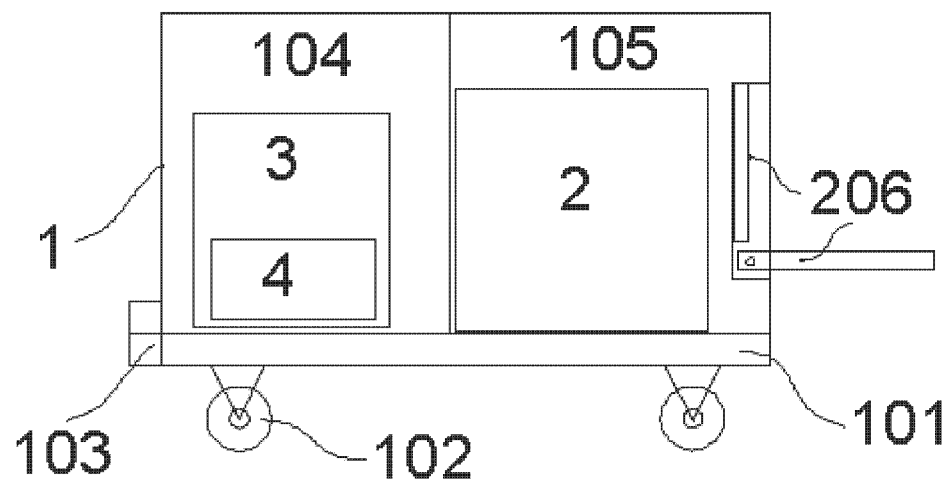
FIG. 6 is a structural schematic view of an small-scale trailed multiple-viewing-angle item inspection system.

FIG. 6 is a structural schematic view of a small-scale trailed multiple-viewing-angle item inspection system according to a still further embodiment of the present invention that is different from that as shown in FIG. 1. The trailed multiple-viewing-angle item inspection system in the present invention may have a plurality of arrangements, such as, a small-scale system obtained by removing the control chamber 106. The inspection chamber 105 may be provided with a movable window in its rear portion, and the display and operation device 206 of the radiation inspection device 2 is mounted to the movable window such that, when the movable window is opened, a window plate may be configured as a platform and an operation device is provided on the platform, and a display device is arranged in the movable window. A worker may stand or sit beside the inspection chamber to operate the device.

Figure 7:
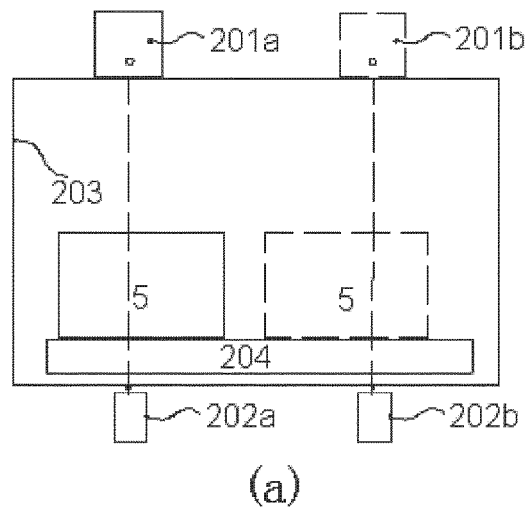
FIG. 7 illustrates schematic views of several arrangement of a plurality of X-ray radiation sources along a traveling direction of the item.
Figure 7:
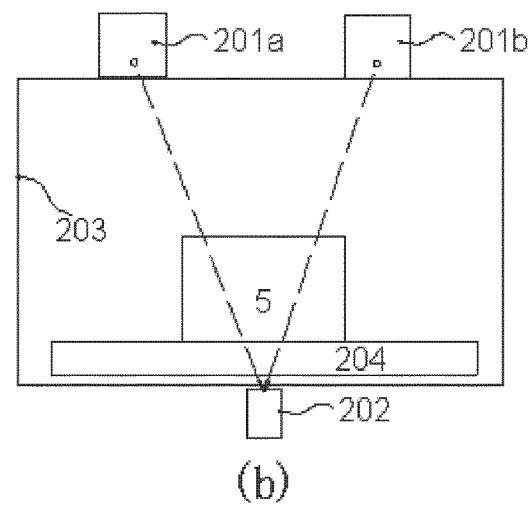
Figure 7:
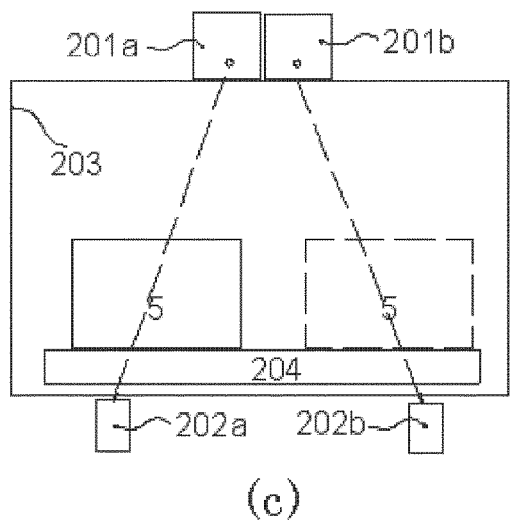
Figure 7:
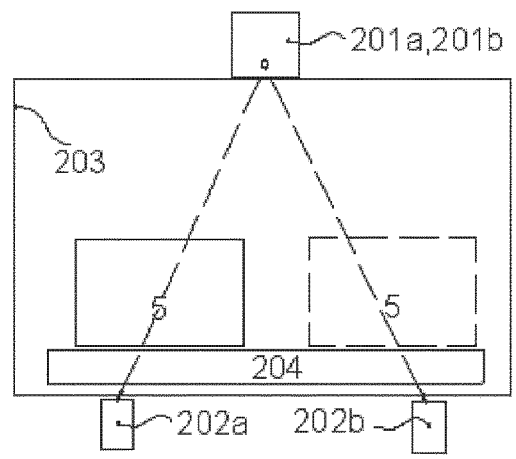

FIG. 7 is a schematic view of arrangement of a plurality of X-ray radiation sources along a longitudinal direction (i.e., traveling direction of the item to be inspected) of the inspection passage. FIG. 7a illustrates an embodiment where the two X-ray radiation sources 201a and 201b are arranged at front and back positions with relative to each other in the inspection passage in the traveling direction of the item to be inspected and also arranged at front and back positions with relative to each other in a viewing direction in a side view (i.e., arranged in left and right positions in the traveling direction of the item to be inspected in the inspection passage), and the detectors are correspondingly arranged in two groups at front and back positions in the inspection passage in the traveling direction of the item to be inspected. The X-rays generated by the X-ray radiation sources 201a and 201b are non-obliquely transmitted into the inspection passage and are received by the corresponding detectors 202a and 202b.

FIG. 7(b) illustrates an embodiment where the two X-ray radiation sources 201a and 201b are arranged in at front and back positions in the inspection passage and separated by a larger distance with relative to each other in the traveling direction of the item to be inspected, and the detectors are arranged in a single group at a position. The X-rays generated by the X-ray radiation sources 201a and 201b are obliquely transmitted into the inspection passage, converged to the detectors 202, and are received by the detectors 202.

FIG. 7(c) illustrates an embodiment where the two X-ray radiation sources 201a and 201b are arranged close to each other at a front and back positions in the inspection passage in the traveling direction of the item to be inspected, and generate respectively X-rays in different oblique directions, and two corresponding groups of detectors are arranged in at front and back positions in the inspection passage and separated by a larger distance with relative to each other in the traveling direction of the item to be inspected. The X-rays generated by the X-ray radiation source 201a are transmitted into the inspection passage at a certain oblique angle and are received by the detector 202a, and the X-rays generated by the X-ray radiation source 201b are transmitted into the inspection passage at an another oblique angle and are received by the detector 202b.

FIG. 7(d) illustrates an embodiment where the two X-ray radiation sources 201a and 201b are arranged at the same positions in the inspection passage in the traveling direction of the item to be inspected and arranged in at front and back positions with relative to each other in a viewing direction in a side view (i.e., arranged in at front and back positions in a normal direction of the paper plane), and moreover, generate respectively X-rays in different oblique directions, and two corresponding groups of detectors are arranged in at front and back positions and separated by a larger distance with relative to each other in the traveling direction of the item to be inspected. The X-rays generated by the X-ray radiation source 201a are transmitted into the inspection passage at a certain oblique angle and are received by the detector 202a, and the X-rays generated by the X-ray radiation source 201b are transmitted into the inspection passage at an another oblique angle and are received by the detector 202b.

An operation process of the trailed multiple-viewing-angle item inspection system is described as below:

(1) in a movement step, the trailed item inspection system is moved to a working location by means of a tractor or manually. The movement step may include the following detail:

a) the trailed item inspection system is brought to a preset working location under traction of the tractor;

b) the tractor is separated from the trailed item inspection system;

c) the trailed item inspection system is positioned at a specific working position by moving wheels thereof;

(2) in preparation step, the inspection system prepares to reach a state where it can take an inspection on the item. The preparation step includes:

a) starting the power supply device to supply electric power or connecting the power grid connection device to a power grid;

b) opening the chamber doors at both sides of the inspection chamber such that an entry transfer section and an exit transfer section of the radiation inspection device are switched from a vertical arrangement in a non-working state to a horizontal arrangement in a working state;

c) starting the trailed multiple-viewing-angle item inspection system by an operator in the control chamber to enter the state where it can take an inspection on the item;

(3) in inspection step, the item is safety inspected by means of the radiation inspection device. The inspection step may include the following processes in detail:

a) placing the item to be inspected on the entry transfer section of the transfer device which carries the item to be inspected into the inspection passage at a certain velocity;

b) emitting X-rays by the X-ray radiation sources at different positions in sequence under control of the control system such that the X-rays penetrates the item to be inspected and are received by the detectors; then, transmitting the signal from the detectors transmit to the data and image process system; wherein an image of a cross section of the item to be inspected is obtained through the X-rays penetrating the item during a X-rays output cycle; when the transfer device carries the item to be inspected to pass through the inspection passage at a certain velocity, a plurality of cross sections of the item are imaged. The inspected item is outputted from the exit transfer section of the transfer device and is taken away. Simultaneously, upon analyzing and processing, the data and image process system obtains multi-depth transmission image or three-dimension image of the inspected item and transmits it to the display and control device for display.

(c) judging, according to the transmission image of the inspected item or an alarm call from the data and image process system after automatically identifying a dangerous item in the image, whether or not the inspected item is dangerous and corresponding measures will be implemented;

d) performing steps a), b), c) continuously and circularly in a continuous operation state;

(4) in a closing and movement step, the radiation inspection device is closed after the inspection step is completed and the trailed item inspection system is again transferred manually or by means of a tractor; the closing and movement step may include the following processes in detail:

a) closing the radiation inspection device when inspection is completed, and switching the entry transfer section and the exit transfer section of the transfer device to the vertical arrangement in the non-working state, closing the chamber doors at both sides of the inspection chamber are closed, and turning off the power supply;

b) connecting the trailed multiple-viewing-angle item inspection system to the tractor when a inspection work is completed in a field, and fast transferring the trailed multiple-viewing-angle item inspection system to another location under action of the tractor.

It can be seen that the trailed multiple-viewing-angle item inspection system and the operation thereof according to embodiments of the present invention may provide a transmission image containing depth information through one pass of the item to be inspected, and thus provide a rapid inspection, good image quality, and a high inspection efficiency of hazardous article while the inspection system can achieve agile transfer to satisfy application requirement of various situations.

It is noted that the above embodiments are merely provided for describe technical schemes of the present invention, instead of limitation on the present invention. Although the present invention is described with reference to the above embodiments, it would be appreciated by those skilled in the art that various changes or modifications may be made in these embodiments or part of the technical features in these embodiments may be replaced equivalently without departing from the principles and spirit of the present invention, the scope of which is defined in the claims and their equivalents.

The invention claimed is:

1. A trailed multiple-viewing-angle item inspection system, comprising a trailer vehicle and a radiation inspection device located on the trailer vehicle, wherein, the trailer vehicle is configured for a long distance movement;

the radiation inspection device comprises a body frame, an inspection passage located within the body frame, a transfer device located below the inspection passage, a ray radiation source fixed on the body frame and detectors fixed on the body frame and located opposite to the ray radiation source; and the ray radiation source includes two ray radiation sources arranged close to each other at a front and back positions or at a same position side by side in the traveling direction of an item to be inspected and two detectors provided in the traveling direction of the item to be inspected at front and back positions and separated from each other by a distance; or, two ray radiation sources arranged at front and back positions in the traveling direction of the item to be inspected and separated from each other by a distance and a detector; wherein the two ray radiation sources generate respectively X-rays beams in different oblique directions with relative to a vertical direction at different oblique angles to irradiate the item to be inspected so as to be detected by the detectors respectively, profile of each of the X-rays beams being located in a plane that cuts through the item to be inspected transversely with relative to the traveling direction and obliquely with relative to a vertical direction.

2. The trailed multiple-viewing-angle item inspection system as claimed in claim 1, wherein, the energy of the ray radiation source is not more than 1 MeV.

3. The trailed multiple-viewing-angle item inspection system as claimed in claim 1, wherein, the ray radiation source comprises at least two X-ray radiation sources arranged at different positions of the body frame, or the ray radiation source comprises at least one distributed multiple target-point X-ray radiation source arranged on the body frame.

4. The trailed multiple-viewing-angle item inspection system as claimed in claim 1, wherein,
the ray radiation source is configured to alternately emit X-rays from at least two different positions, or
the X-ray radiation source is configured to simultaneously emit X-rays from at least two different positions.

5. The trailed multiple-viewing-angle item inspection system as claimed in claim 1, wherein,
the detectors are arranged into one group and are configured to receive the X-rays, at different times, emitted from the ray radiation source at different positions.

6. The trailed multiple-viewing-angle item inspection system as claimed in claim 1, wherein,
the detectors are arranged into groups which are the same in number as the positions from which the X-rays are emitted and which are configured to respectively receive X-rays emitted from the corresponding positions.

7. The trailed multiple-viewing-angle item inspection system as claimed in claim 1, wherein,
the radiation inspection device further comprises a data and image process system and a display and operation device.

8. The trailed multiple-viewing-angle item inspection system as claimed in claim 1, wherein,
the trailer vehicle comprises: a chassis, moving wheels fixed at a lower portion of the chassis, a trailing connection device located at an end of the chassis and a chamber located above the chassis;
the moving wheels comprise: two groups of front wheels and two groups of rear wheels, and a brake device configured to brake the front wheels and/or the rear wheels,
the trailed multiple-viewing-angle item inspection system further comprises an immovable support device configured to provide a fixed support for the chassis at a fixed location, replacing the front wheels and the rear wheels.

9. The trailed multiple-viewing-angle item inspection system as claimed in claim 1, wherein,
the transfer device comprises: a main body section located within the body frame and configured to carry the item to be inspected to pass through the inspection passage, and an entry extension section and an exit extension section located outside the body frame, the entry extension section being configured to carry the item to be inspected into the inspection passage and the exit extension section being configured to carry the item from the inspection passage and transfer it to a suitable position for taking away.

10. The trailed multiple-viewing-angle item inspection system as claimed in claim 9, wherein,
the radiation inspection device comprises a mechanical structure configured to switch the entry extension section and the exit extension section between a horizontal position in a working state and a vertical position in a non-working state.

11. The trailed multiple-viewing-angle item inspection system as claimed in claim 1, further comprising:
a power supply device comprising at least one of a generator and a battery pack, and configured to supply electric power to the radiation inspection device.

12. The trailed multiple-viewing-angle item inspection system as claimed in claim 1, further comprising:
a power grid connection device comprising a cable, a coupling and a switch, which are configured to couple the radiation inspection device to a power grid.

13. The trailed multiple-viewing-angle item inspection system as claimed in claim 8, wherein,
the chamber comprises: a power supply chamber within which a power supply device and/or a power grid connection device is mounted, and an inspection chamber within which the radiation inspection device is mounted.

14. The trailed multiple-viewing-angle item inspection system as claimed in claim 8, wherein,
the inspection passage of the radiation inspection device is arranged perpendicular to an axis of the chassis and the inspection chamber is provided with chamber doors at locations on both sides thereof corresponding respectively to openings of the inspection passage.

15. The trailed multiple-viewing-angle item inspection system as claimed in claim 8, wherein,
the chamber further comprises: a control chamber within which a display and operation device for the radiation inspection device, and a desk and a chair are arranged.

16. The trailed multiple-viewing-angle item inspection system as claimed in claim 3, wherein,
the at least two X-ray radiation sources are arranged in an array around the inspection passage.

17. The trailed multiple-viewing-angle item inspection system as claimed in claim 3, wherein,
the target points of the distributed multiple-target-points X-ray radiation source are arranged in an array to surround or partially surround the inspection passage.

18. A multiple-viewing-angle item inspection system, comprising:
a body frame;
an inspection passage located within the body frame;
a transfer device located below the inspection passage;
an ray radiation source fixed on the body frame and configured to alternately emit X-rays from at least two different positions while being motionless with respect to the inspection passage, ray sections formed by the ray passing through the inspection passage intersecting each other;
detectors fixed on the body frame, located at a position where the ray sections intersect and configured to receive the X-rays;
a data and image process system; and
a display and operation device.

* * * * *